United States Patent [19]

Berke et al.

[11] Patent Number: 4,934,806
[45] Date of Patent: Jun. 19, 1990

[54] SPECTACLES WITH TEMPLE DUAL PIVOT REAR VISION ELEMENTS

[75] Inventors: Joseph J. Berke, 2063 Long Lake Shore, West Bloomfield, Mich. 48033; George H. Muller, Long Boat Key, Fla.

[73] Assignee: Joseph J. Berke, West Bloomfield, Mich.

[21] Appl. No.: 243,870

[22] Filed: Sep. 13, 1988

[51] Int. Cl.$^5$ .............................................. G02C 7/14
[52] U.S. Cl. ...................................... 351/50; 350/638
[58] Field of Search .................... 351/50, 158; 350/638

[56] References Cited

U.S. PATENT DOCUMENTS 1,080,893 12/1913 Collier .
1,691,789 11/1928 Teiber .
2,176,167 10/1939 Comstock .
2,334,610 11/1943 Crawford ............................ 350/638
2,371,196  3/1945 Swan ..................................... 351/50
4,349,246  9/1982 Binner .

FOREIGN PATENT DOCUMENTS 1008495  2/1962 France .................................. 351/50

Primary Examiner—Rodney B. Bovernick
Attorney, Agent, or Firm—Alex Rhodes

[57] ABSTRACT

A fashionable pair of spectacles with a pair of dual pivot rear vision elements for viewing objects behind a forward facing user. The spectacles include a binocular eyepiece, a pair of symmetrically opposite temples rotatably attached to opposite end portions of the eyepiece, a pair of arms having windows for viewing dual pivot elements in their operative positions rotatably attached to the end portions of the eyepiece, and the pair of dual pivot elements having reflective surfaces rotatably attached to the arms. The dual pivot elements are rotatable about their attachments to the arms from non-operative stored positions alongside the temples whereat their reflective surfaces are in facing relationship to the user to operative positions whereat the arms extend forward of the eyepiece, the rear vision elements extend outwardly from the arms and the reflective surfaces of the elements are in facing relationship to the user.

8 Claims, 1 Drawing Sheet

U.S. Patent
Jun. 19, 1990
4,934,806
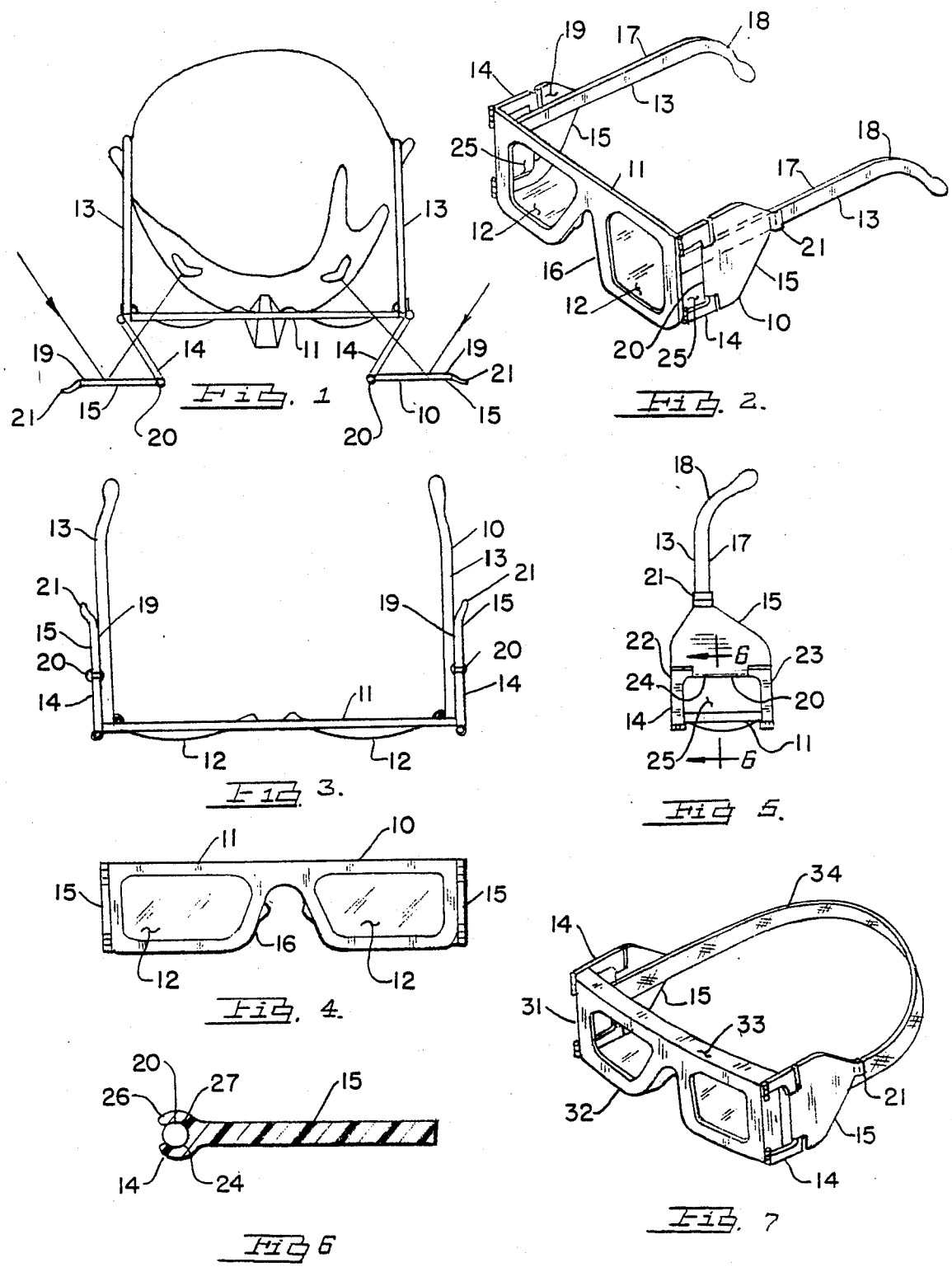

SPECTACLES WITH TEMPLE DUAL PIVOT REAR VISION ELEMENTS

BACKGROUND OF THE INVENTION

This invention relates to spectacles which enable a forward facing person to view objects behind the user. The need for rear vision spectacles was discussed in co-pending application Ser. No. 07/243,871, filed on Sept. 13, 1988. It was pointed out in the co-pending application that rear vision spectacles would entertain many of their users as well as contributing to the safety of motorists, motorcyclists, bicyclists, joggers, industrial workers, servicemen, policemen and pedestrians. It was also pointed out that despite these benefits, prior concepts have not been successful because of their inherently unsightly appearance, functional deficiencies, and incompatibility with conventional type eyeglass cases. Comstock U.S. Pat. No. 2,176,167, Binner U.S. Pat. No. 4,349,246 and Teiber U.S. Pat. No. 1,691,789, were cited as being exemplary of the prior art.

The referenced co-pending application disclosed a pair of rear vision spectacles having pair of folded single pivot rear vision elements which ar independently adjustable to operative rear viewing positions and to non-operative stored positions. Each element has a mounting portion with a window which is attached to the mid-portion of an eyepiece and wraps around the eyepiece in the non-operative position of the element and a reflective portion which is in side facing relationship and alongside the temples in the non-operative position. In the operative position of the elements, the mounting portions are rotated away from the eyepiece and the reflective portions are well forward of the eyepiece and visible to the user through the windows of the mounting portions. In the non-operative position of the rear vision elements, the elements are not readily discernible as separate components of the spectacles.

Although the spectacles in the referenced co-pending application provide important benefits over the prior art, one limitation of the single pivot rear vision elements is that the angular and lateral locations of the reflective portions wherein objects behind a user are viewed cannot be separately adjusted because the elements are rotatable about a single axes and the angular relationships of the mounting and reflective portions are fixed.

SUMMARY OF THE INVENTION

The present invention is a fashionable, effective, easy to use pair of rear vision spectacles having dual pivot elements for viewing objects behind a user. The invention comprises a binocular eyepiece, a pair of symmetrically opposite temples attached to opposite outer end portions of the eyepiece for rotation about vertical axes, a pair of arms rotatably attached to the opposite outer end portions of the eyepiece, and a pair of dual pivot rear vision elements rotatably attached to the ends of the arms, each of which are rotatably adjustable about a pair of axes to a non-operative position and to an operative position for viewing objects behind the user. In the non-operative position of the dual pivot elements, the arms and elements are in side facing relationship to the user alongside the temples and in the operative positions of the elements, the arms extend forward and the rear vision elements are visible through windows in the arms to the user for viewing objects behind the user.

In one embodiment of the invention, the spectacles are a pair of eyeglasses and in another embodiment the spectacles are a pair of goggles.

One feature of the invention is that each rear vision element is independently adjustable about a pair of axes.

Another feature of the invention is that the positions of lateral and angular positions of the rear vision elements are independently adjustable for enlarging the user's rear field of vision.

Another feature of the invention is that when the dual pivot elements are not in use they are stored in side facing relationship to the eyepiece alongside the temples.

It is a primary object of the invention to provide an effective and easy to use pair of rear vision spectacles which are fashionable and will not make the wearer conspicuous in public.

It is another object, in addition to the foregoing object, to provide in a pair of rear vision spectacles a wide range of adjustment o±the rear field of vision.

Additional features and benefits and objects of the invention will become apparent from the ensuing description and accompanying drawings which describe the invention in detail. A preferred embodiment and the manner of using the same are disclosed in accordance with the best mode contemplated in practicing the invention and the subject matter in which exclusive property rights are claimed is set forth in each of the numbered claims at the conclusion of the detailed description of the invention.

BRIEF DESCRIPTION OF THE DRAWINGS

FIG. 1 is a plan view of a person with a pair of spectacles having dual pivot rear vision elements shown in their operative positions.

FIG. 2 is a perspective view of the spectacles of FIG. 1 showing the dual pivot rear vision elements in their non-operative positions.

FIG. 3 is a plan view of the spectacles of FIG. 1 with the dual pivot elements in their non-operative positions.

FIG. 4 is a front view of the spectacles shown in FIGS. 1 and 2.

FIG. 5 is a left side view of the spectacles shown in FIG. 3.

FIG. 6 is a sectional view drawn to an enlarged scale taken on the line 6—6 of FIG. 4.

FIG. 7 is an alternate embodiment of the invention.

DETAILED DESCRIPTION OF THE PREFERRED EMBODIMENT

Referring now to the drawings, wherein like numerals designate like and corresponding parts throughout the several views, the particular embodiment 10 disclosed for purpose of illustrating the invention, in FIGS. 1 through 6, inclusive, comprises a binocular eyepiece 11, a pair of lenses 12 mounted in the eyepiece 11, a pair of temples 15 rotatably attached to opposite end portions of the eyepiece 11; a pair of arms 14 rotatably attached to the opposite end portions of the eyepiece 11; and a pair of rear vision elements 15 rotatably attached to the arms 14.

The spectacles are worn in the same manner as a pair of conventional spectacles, i.e., supported on the nose and ears of a user. The eyepiece 11 has an upward extending recess 16 in the center for mounting the eyepiece 11 on the user's nose. The temples 13 are conventional with straight forward portions 17 which attach to the eyepiece 11 and adjoining arcuate rear portions 18 for mounting the temples 13 on the user's ears. The lenses 12 may be refractive type for correcting the user's vision and/or tinted type commonly used in sun glasses.

The dual pivot elements 15 are an important feature of the spectacles 10. Each dual pivot element 15 has at least one reflective surface 19 and is selectively adjustable to an operative position whereat the reflective surface 19 is in front of the eyepiece 11 in clear view of the user and to an non-operative position whereat the reflective surface 19 is at the side of the eyepiece 11 in side facing relationship to the user. The reflective surface 19 may be on the side of the element 15 adjacent to the user as shown in the non-operative position in FIG. 2, on the opposite side of the element 15, or on both sides of the element 15. From their attachments 20 to the arms 14, the dual pivot elements 15 taper rearwardly to end portions which form finger tabs 21 for grasping the elements 15 during their adjustments.

The construction of the arms 14 is shown in FIGS. 1 and 5. The arms 14 are U-shaped and have thin spaced apart horizontal upper 22 and lower 23 portions which are rotatably attached to the eyepiece 11 and thin vertical rear 24 portions which interconnect the rear end portions of the upper 22 and lower 23 portions. The spaces 25 between the horizontal 22, 23 and vertical 24 portions are windows 25 for viewing the rear vision elements 15 at their operative positions. In lieu of the U-shaped arms 14, full transparent members (not shown) may be used for viewing the dual pivot elements 15 at their operative positions.

The dual pivot elements 15 are rotatably attached to the arms 14 as shown in FIGS. 1 and 2 or by other suitable means. The forward portions of each element 15 has a slotted arcuate recess 26 which engages a round slender portion 27 of an arm 14. The elements 15 are preferably made of a resilient plastic material which can yield to forcibly engage the arcuate recess 26 with the round portions 27 of the arms 14.

The operative positions of the dual pivot elements 15 are shown in FIGS. 1 and 2. In the operative position shown in FIG. 1, the arms 14 extend forward slightly inward towards the center of the eyepiece 11, the dual pivot elements 15 extend outward from the ±r attachments 20 to the arms 14, well forward of the eyepiece 11, and the reflective surfaces 19 of the elements 15 are in clear view to the user through the windows 25 of the arms 14.

The manner of using the invention is as follows. The finger tabs 21 of the dual pivot elements 15 are grasped and the elements 15 and arms 14 rotated outwardly away from the temples 13. If the reflective surfaces 19 are initially adjacent to the user, as shown in FIG. 1, the arms 14 are rotated slightly more than 180 degrees about their attachments 20 to the eyepiece 11 and the elements 15 rotated outwardly about their attachments 20 slightly less than 90 degrees. If the reflective surfaces 29 are on the opposite sides of the elements 30, as shown in FIG. 7, the arms 14 are rotated slightly less than 180 degrees about their attachments 20 to the eyepiece 11 and the elements 30 rotated outwardly about their attachments 20 to the arms 14 slightly more than 90 degrees.

At the operative positions, both lateral and angular positions of the dual pivot elements 15 are independently adjustable. This feature provides a wide range of adjustment for viewing objects at the rear. When the dual pivot elements 15 are not in use, the elements 15 and the arms 14 are rotated inwardly and aligned with the temples 13 whereat they are not readily discernible as separate members of the spectacles.

With reference to FIG. 8, the invention is shown adapted to an eyepiece 32 having protective side shields 33, commonly referred to as goggles 31. Attached to the ends of the eyepiece 32 is a head band 34 for mounting the eyepiece 32 on the user's head.

From the foregoing, it will be appreciated that the present invention provides an attractive, easy to use and effective pair of rear vision spectacles for viewing objects behind a forward facing user.

Although but several embodiments have been illustrated and described it will be understood that other embodiments can be provided by changes in material, size, shape and arrangement of parts without departing from the spirit thereof.

We claim:

1. A pair of spectacles with dual pivot elements for viewing objects behind a user comprising, in combination: an eyepiece, at least one lens mounted in said eyepiece; a pair of symmetrically opposite temples rotatably attached to opposite end portions of said eyepiece for mounting said eyepiece on the head of the user, said temples having slender straight forward portions and adjoining arcuate rearward portions; at least one U-shaped arm rotatably attached to one end portion of the eyepiece, said arm being selectively rotatable from a stored position adjacent to the user's head and said temple to an operative position forward of user's head and comprising a slender upper horizontal portion rotatably attached to an upper end portion of said eyepiece, a slender lower horizontal portion rotatably attached to a lower end portion of said eyepiece and a slender cylindrical vertical portion fixedly interconnecting said upper and lower horizontal portions; and at least one dual pivot rear vision element, said dual pivot element rotatably attached at one end portion thereof to said sender cylindrical vertical portion of said U-shaped arm and having a reflective surface for viewing objects behind the user and being selectively positionable outwardly away from a stored position adjacent to said temple and the user's head whereat said reflective surface is in facing relationship to said user's head to an operative position forward of said eyepiece whereat said rear viewing element extends outwardly from said arm and said reflective surface is in facing relationship to said user for viewing objects behind said user.

2. The spectacles with dual pivot rear vision elements recited in claim 1 wherein said eyepiece is a binocular eyepiece.

3. The spectacles with dual pivot rear vision elements recited in claim 1 wherein said lens is a refractive type lens.

4. The spectacles with dual pivot rear vision elements recited in claim 1 wherein said lens is a tinted type lens.

5. The spectacles with dual pivot rear vision elements recited in claim 1 wherein said arm is a transparent member.

6. The spectacles with dual pivot rear vision elements recited in claim 1 further comprising a second reflective surface on the opposite side of said dual pivot element.

7. A pair of spectacles with temples and further having a dual pivot elements for viewing objects behind a forward facing user said spectacles comprising, in combination: an eyepiece, at least one U-shaped arm rotatably attached to one end portion of the eyepiece, said arm comprising a pair of spaced apart horizontal upper and lower portions rotatably attached at one end portion to the eyepiece and a vertical rear portion interconnecting the horizontal portions, said vertical portion having a slender cylindrical portion for rotatably attaching a dual pivot element; and a dual pivot element for viewing objects behind the forward facing user, said dual pivot element having a split arcuate end portion for rotatably attaching said element to said U-shaped arm by resiliently engaging the arcuate end portion with the slender cylindrical portion of said arm and a reflective surface for viewing objects behind the user and being selectively positionable outwardly away from a stored position adjacent to said temple and the user's head whereat said reflective surface is in facing relationship to said user's head to an operative position forward of said eyepiece whereat said rear viewing element extends outwardly from said arm and said reflective surface is in facing relationship to said user for viewing objects behind said user.

8. A pair of spectacles with dual pivot elements for viewing objects behind a user comprising, in combination: an eyepiece having side shields surrounding the periphery of said eyepiece, at least one lens mounted in said eyepiece; a headband attached to the ends of the eyepiece for mounting the eyepiece on the user's head; at leas one U-shaped arm rotatably attached to one end portion of the eyepiece, said arm being selectively rotatable from a stored position adjacent to the head band near the user's temple area to an operative position forward of said user's head and having a slender upper horizontal portion rotatably attached to an upper end portion of said eyepiece, a slender lower horizontal portion rotatably attached to a lower end portion of said eyepiece and a slender cylindrical vertical portion fixed interconnecting said upper and lower horizontal portions; and at least one dual pivot rear vision element, said dual pivot element rotatably attached at one end portion thereof to said slender cylindrical vertical portion of said U-shaped arm and having a reflective surface for viewing objects behind the user and being selectively positionable outwardly away from a stored position adjacent said head band whereat said reflective surface is in facing relationship to said user's head to an operative position forward of said user's head whereat said rear viewing element extends outwardly from said arm and said reflective surface is in facing relationship to said user for viewing objects behind said user.

* * * * *

UNITED STATES PATENT AND TRADEMARK OFFICE
CERTIFICATE OF CORRECTION

PATENT NO. : 4,934,806
DATED : June 19, 1990
INVENTOR(S) : Joseph J. Berke and George H. Muller It is certified that error appears in the above-identified patent and that said Letters Patent is hereby corrected as shown below:

In the specification:

Column 1, line 24, change "ar" to --are--

Column 2, line 20, change "o$^{\pm}$" to --of--

Column 2, line 57, change "temples 15" to --temples 13--

Column 3, line 44, change "the$^{\pm}$r" to --their--

Column 4, line 4, change "FIG. 8" to --FIG. 7--

Column 6, line 10, change "fixed" to --fixedly--

Signed and Sealed this

Twentieth Day of August, 1991

*Attest:*

HARRY F. MANBECK, JR.

*Attesting Officer*     *Commissioner of Patents and Trademarks*